United States Patent [19]
Smith

[11] Patent Number: 5,267,533
[45] Date of Patent: Dec. 7, 1993

[54] SELF-ADJUSTING PACKING GLAND FOR SOOTBLOWER

[75] Inventor: Don W. Smith, Lancaster, Ohio

[73] Assignee: The Babcock & Wilcox Company, New Orleans, La.

[21] Appl. No.: 916,524

[22] Filed: Jul. 20, 1992

[51] Int. Cl.⁵ ............................................ F22B 37/18
[52] U.S. Cl. .................................. 122/379; 15/317; 277/104; 277/113; 122/392
[58] Field of Search ............... 15/316.1, 317, 318; 277/113, DIG. 1, DIG. 8, 104, 106; 122/379, 382, 392

[56] References Cited

U.S. PATENT DOCUMENTS

| | | |
|---|---|---|
| 48,599 | 7/1865 | Swartz . |
| 4,317,573 | 3/1982 | Karkkainen ............... 277/113 |
| 4,351,512 | 9/1982 | Siver ........................... 251/14 |
| 4,386,783 | 6/1983 | Davis ........................... 277/73 |
| 4,750,548 | 6/1988 | Albers et al. ........... 122/379 X |
| 4,890,542 | 1/1990 | Miller et al. .............. 92/194 |
| 4,924,817 | 5/1990 | Seelen ....................... 122/379 |
| 5,090,087 | 2/1992 | Hipple et al. .............. 15/317 |

*Primary Examiner*—Edward G. Favors
*Attorney, Agent, or Firm*—Harness, Dickey & Pierce

[57] ABSTRACT

A self-adjusting joint packing for a sootblower of the type having a stationary feed tube gland with an overfitting lance tube which is moved within the combustion device to emit a blowing medium for cleaning purposes. The joint packing gland mechanism causes the axial loading on the joint packing which forms a seal between the lance tube and the feed tube to be automatically adjusted upon each sootblower actuation cycle. The joint packing gland includes an actuator which engages the sootblower frame upon actuation of the sootblower causing relative rotation between the actuator and lance tube. A friction clutch is interposed between the actuator and a threaded gland to transmit rotation only when a packing preload force is below a predetermined level, thus adjusting packing force when needed.

11 Claims, 1 Drawing Sheet

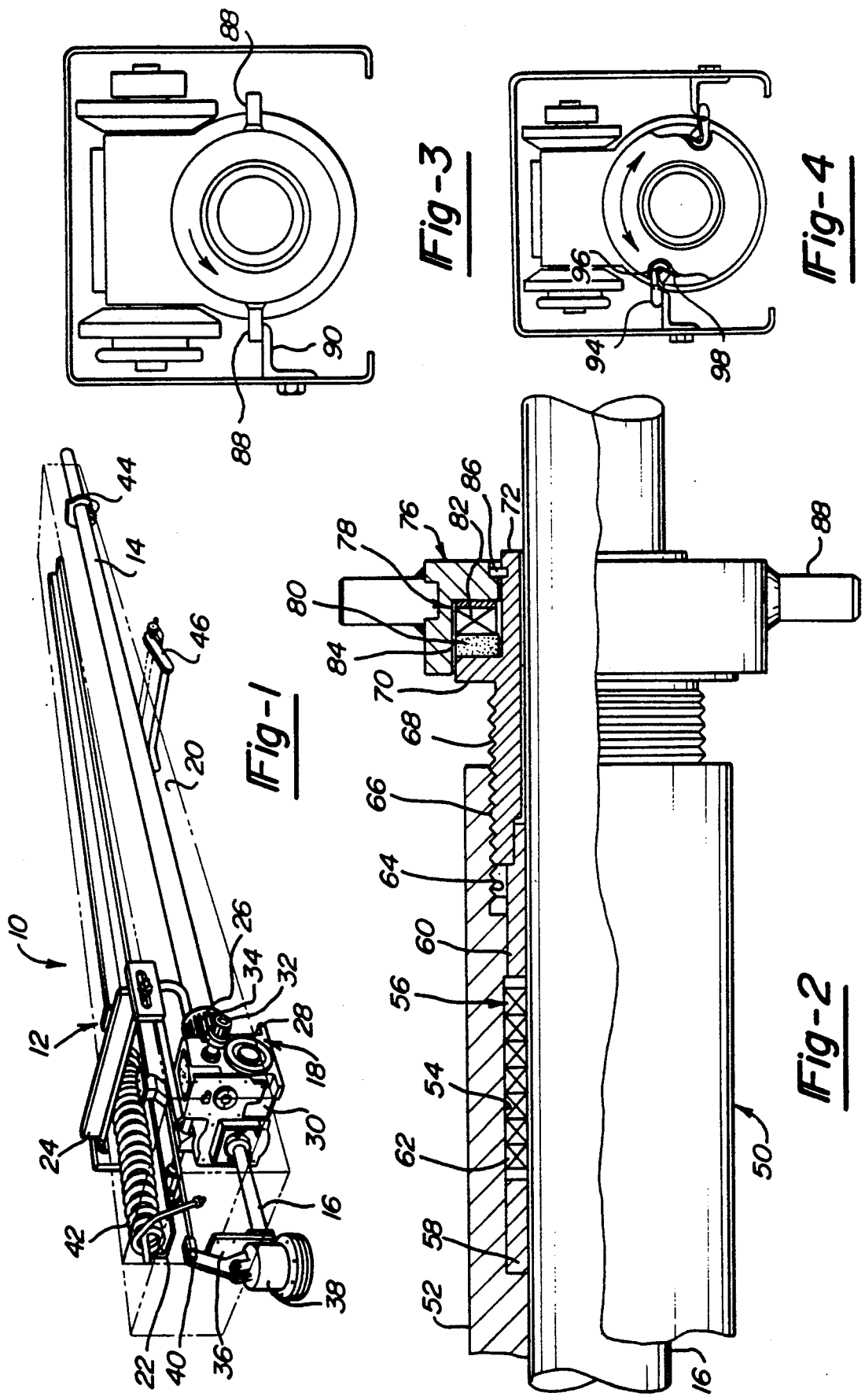

SELF-ADJUSTING PACKING GLAND FOR SOOTBLOWER

BACKGROUND AND SUMMARY OF THE INVENTION

This invention generally relates to sootblowers which are used to project a stream of a fluid cleaning medium against internal surfaces of a combustion device. In particular, this invention concerns a joint packing assembly which provides sealing between a stationary sootblower feed tube and a relatively movable lance tube which has a self-adjusting characteristic.

Sootblowers are used to project a stream of fluid cleaning medium such as water, air or steam against heat transfer surfaces within a combustion device such as large scale boilers to cause slag and ash encrustations to be removed. The cleaning medium impact produces mechanical and thermal shock which causes these adhering layers to be removed. One general category of sootblowers is known as the long retracting type. These devices have a retractable lance tube which is periodically advanced into and withdrawn from the boiler, and is simultaneously rotated such that one or more cleaning nozzles on the lance tube project a jet tracing a helical path. A feed tube is provided which is supplied with the cleaning medium through a poppet valve. The sootblower lance tube over-fits the feed tube in a telescope fashion and its extension and rotational motion is controlled by a carriage. The sootblowing medium supplied to the feed tube flows into the lance tube and exits through one or more nozzles.

To prevent leakage of sootblowing medium joint packing is provided between the feed tube and the lance tube. This packing is typically incorporated into a hub within the sootblower carriage which provides a mounting surface for securing and driving the lance tube. In order to generate the desired sealing action between the hub and feed tube, it is necessary to apply an axial force or "loading" on the packing material. This force is provided through a packing gland which acts on one end of the packing, causing the packing to be squeezed into sealing engagement with the feed tube and hub. As the packing material wears, the initial axial force or preloading decreases. This force loss can result in undesirable leakage through the packing.

Various types of packing loading systems are presently known. In one type, gland adjustment bolts are used which are torqued to provide a desired loading. Such packing gland systems must be adjusted frequently to prevent joint leakage. In order to accommodate some degree of packing wear, the initially set loading of the packing gland is greater than that necessary to provide sealing. This "excess" packing load generates higher friction which the drive motor must overcome, thereby increasing power requirements and drive system wear, as well as causing an accelerated rate of packing wear.

An improved packing system is known for providing a "live" packing loading through the use of a compliant element such as a stack of Belleville type spring washer. An example of such a live loaded packing gland is provided by U.S. Pat. No. 5,090,087 issued to the Assignee of this application which is hereby incorporated by reference. In a live loaded type packing gland, a greater tolerance for wear is provided since the packing gland is able to displace in response to wear of the packing material. Although such live loaded packing glands are a significant improvement over the prior art, they nonetheless must be periodically adjusted. In addition, due to changes in the compression of the compliant element of a live loaded packing gland, a range of packing loading force occur between adjustments. Thus after initial setting of the live loaded packing the loading force is greater than that actually necessary to provide sealing, generating higher motor loads, and component and packing wear.

The packing gland assembly of this invention provides a self-adjusting feature in which a relatively constant load is applied to the packing and the packing gland is automatically adjusted to accommodate wear through normal use of the sootblower mechanism. Such self-adjustment is achieved through the use of an actuating element which is restrained from moving relative to the hub upon actuation of the sootblower. The actuating element is coupled through a clutch mechanism to the joint packing. When the packing loading is below a predetermined desired level, the actuating element drives a packing adjustment bushing to increase the loading. If, on the other hand, the packing loading is at or above the predetermined level, the clutch mechanism disengages preventing the packing loading from being increased by the mechanism. Accordingly, the packing gland of this invention operates in a manner akin to a motor vehicle drum brake having a self-adjusting feature to accommodate wear in the brake shoes.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of a long retracting sootblower of a type which may incorporate the self-adjusting packing gland of the present invention.

FIG. 2 is a side view, partially in elevation and partially in section, showing the self-adjusting packing gland assembly of this invention.

FIG. 3 is a rear view of the sootblower and packing gland assembly shown in FIGS. 1 and 2, particularly showing the actuating element.

FIG. 4 is a rear view of an actuating element according to an alternate embodiment of this invention for sootblowers featuring bi-directional rotation.

DETAILED DESCRIPTION OF THE INVENTION

A representative sootblower which may incorporate the features of the present invention is shown in FIG. 1 and is generally designated there by reference number 10. Sootblower 10 principally comprises frame assembly 12, lance tube 14, feed tube 16 and carriage 18. Sootblower 10 is shown in its normal retracted resting position. Upon actuation, lance tube 14 is extended into and retracted from a combustion device such as a boiler (not shown) and is simultaneously rotated.

Frame assembly 12 has a generally rectangularly shaped frame box 20 which forms a housing for the entire unit. Carriage 18 is guided along two pairs of tracks located on opposite sides of frame box 20, including a pair of lower tracks (not shown) and upper tracks 22. The tracks are made from angle iron stock which are connected to frame box 20. A pair of toothed racks (not shown) are rigidly connected to the upper tracks and are provided to enable longitudinal movement of carriage 18. Frame assembly 12 is supported at a wall box (not shown) which is affixed to the boiler wall or another mounting structure and is further supported by rear support hanger 24.

Carriage 18 drives lance tube 14 into and out of the boiler and includes drive motor 26 and gear box 28 which are enclosed by housing 30. Carriage 18 drives a pair of pinion gears 32 which engage the toothed racks to longitudinally advance the carriage and lance tube 14. Support rollers 34 engage the guide tracks to support carriage 18.

Feed tube 16 is attached at one end of rear bracket 36 and conducts the flow of cleaning medium which is controlled through the action of poppet valve 38. Poppet valve 38 is actuated through linkage 40 which is engaged by carriage 18 to begin cleaning medium discharge upon extension of lance tube 14, and cuts off the flow once the lance tube and carriage return to their idle retracted position as shown in FIG. 1. Lance tube 14 overfits feed tube 16 and a fluid seal between them is provided by a packing. The details of the packing and the hub which houses it are principal aspects of the invention and are described in more detail below.

Coiled electrical cable 42 conducts power to drive motor 26. Front support bracket 44 has bearings which support lance tube 14 during its longitudinal and rotational motion. For long lance tube lengths, an intermediate support 46 may be provided to prevent excessive bending deflection of the lance tube. Additional details of the construction of the well-known "IK" type of sootblowers manufactured by the assignee can be found with reference to U.S. Pat. Nos. 4,339,367 and 4,803,959, both of which are hereby incorporated by reference.

Now with specific reference to FIG. 2, the hub assembly according to this invention having a self-adjusting packing is shown which is generally designated by reference number 50. Hub assembly 50 is located within carriage 18 and is employed to drive lance tube 14 through its longitudinal and rotational movement. Hub assembly 50 is driven for rotation through a beveled gear (not shown) and is supported by bearing assemblies (not shown) which support the hub assembly relative to carriage 18. Hub shell 52 is a tubular machined element having external surfaces for engaging the bearing assemblies and the drive gear. At the left-hand end of hub shell 52 a lance tube mounting collar (not shown) is provided for mounting lance tube 14.

Hub shell 52 provides an internal cylindrical clearance area defining stuffing box 54 which accommodates packing 56. Packing 56 is located between front bushing 58 and rear bushing 60. Bushings 58 and 60 combine to apply an axial compressive force or "loading" onto packing 56. Packing 56 may be comprised of any one of numerous types of known packing material. One packing system in use today comprises a number of individually formed rings 62 of graphite foil material.

Hub shell 52 has internal threads 64 near the rear side (right-hand end of FIG. 2) of the sootblower. A tubular threaded gland 66 with external threads 68 meshes with hub shell threads 64. Threaded gland 66 is press-fit onto rear bushing 60 such that as the threads 64 and 68 are advanced gland 66 is "screwed into" hub shell 52, causing an increasing axial loading to be placed on packing 56. Each of the hub components including hub shell 52, front and rear bushings 58 and 60, and threaded gland 66 define internal bores which have a clearance relationship with feed tube 16. Actual contact between hub assembly 50 and feed tube 16 is through packing 56.

As shown in FIG. 2, threaded gland 66 also includes a radially projecting flange 70 and an unthreaded tube end 72. Encircling threaded gland end 72 is actuation ring 76 which, with threaded gland tube end, define an annular chamber for friction clutch 78. Friction clutch 78 includes a ring of friction material 80 which is axially biased by a compliant element 82 (shown in symbolic fashion). Compliant element 82 can take various forms such as a stack of Belleville type spring washers or a number of individual coil springs distributed around the perimeter of the clutch. The compliant element 82 urges friction material 80 into contact with the rear surface of gland flange 70. In order to assure that friction material 80 rotates with actuation ring 76, interfitting splines 84 are provided at the interface between friction material 80 and the inside diameter formed by actuation ring 76. When installating actuation ring 76 onto threaded gland 66, once compliant element 82 is compressed, snap ring 86 is installed to maintain a desired level of clutch clamping load. Friction clutch 78 enables a limited torque to be transmitted between actuation ring 76 and threaded gland 66 until a predetermined torque level is reached, upon which the actuation ring and threaded gland become decoupled, allowing the actuation ring to rotate without continued rotation (and packing load adjustment) of the threaded gland.

Actuation ring 76 has a pair of projecting stop pins 88 welded to the ring at diametrically opposite positions. Stop pins 88 engage with stop bar 90 which is a short length of angle iron mounted to frame box 20. Stop bar 90 is positioned so that one of the stop pins 88 will engage it upon rotation of the lance tube.

In some sootblower designs, lance tube 14 is rotated in a counter-clockwise direction as shown by the arrow in FIG. 3 both upon extension of the lance tube and retraction. At the initiation of an actuation sequence, lance tube 14 is driven for rotation by hub 50. Such rotation involves all of the components of the hub 50 until one of the stop pins 88 contacts stop bar 90 at which time the continued rotation of actuation ring 76 is arrested. Such restriction of motion of actuation ring 76 causes relative rotation between ring 76 and hub shell 52 and thus a torque acts o threaded gland 66 in the direction causing the threaded gland to thread into the hub shell.

In the event that the axial loading placed on packing 56 by bushings 58 and 60 is below a predetermined desired level, a relatively low friction force must be overcome in order to cause threaded gland 66 to thread into hub shell 52, which would increase the packing force. The characteristics of friction clutch 78 are selected such that rotation of threaded gland 66 occurs until a desired packing force is reached. Once that force is reached the frictional forces necessary to continue threading of threaded gland 66 are equal to or greater than the torque transmitting characteristic of friction clutch 78, thus allowing relative rotation to occur between the threaded gland and actuation ring 76 and stopping further increase of packing load.

Since it is unlikely that a high degree of adjustment would be necessary on each actuation cycle, the longitudinal length of stop bar 90 along the frame can be limited such that, at most, only one or two revolutions of actuation ring 76 relative to hub shell 52 ar possible. Restraint of actuation ring 76 during the entire extension and retraction motion of the lance tube would likely lead to excessive wear of friction clutch 58. A short length of stop bar 90 can be placed anywhere along frame box 20, but is probably most conveniently located at the rearmost end of sootblower 10. Two stop pins 88 are shown to ensure that no more than 180° of rotation will occur before packing adjustment can begin.

In some sootblowers, the direction of rotation of lance tube 14 reverses during retraction as compared with extension. With the embodiment of hub assembly 50 shown, such reversal of rotation could cause an unintended reduction in packing preload due to threaded gland 66 being unthreaded out of hub shell 52 (which takes less torque than threading in). In order to preclude such a condition from occurring, friction clutch 58 could be designed to be inherently a one-way clutch which would free-wheel in a direction of loosening. Alternatively, as shown in FIG. 4, stop pins 88 could be modified so that they can be driven in only one rotational direction which correlates to increasing packing load. As shown in FIG. 4, hinged stop dogs 94 are shown which are rotatable about pivot pins 96 and are biased by springs 98 such that they will deflect without engagement with stop bar 90 in the clockwise direction (as viewed from the rear) but will be engaged and driven like stop pins 88 shown in FIG. 3 in the counterclockwise direction.

Although this invention is described in connection with a retracting type sootblower, the concepts of this invention could also be applied to other sootblower types, such as stationary rotating sootblowers which do not retract.

While the above description constitutes the preferred embodiments of the present invention, it will be appreciated that the invention is susceptible of modification, variation and change without departing from the proper scope and fair meaning of the accompanying claims.

I claim:

1. In a sootblower device having a feed tube with an overfitting lance tube moveable with respect to said feed tube for conducting a blowing medium which is ejected from one or more nozzles carried by said lance tube, a self-adjusting packing gland for a packing for providing a seal between said feed tube and said lance tube, comprising:
   a gland acting on said packing for placing a loading on said packing;
   an actuator which is displaced relative to said lance tube in response to actuation of said sootblower; and
   clutch means for selectively coupling said gland and said actuator whereby displacement of said actuator is coupled to said gland to cause said gland to place an increased loading on said packing when said loading is less than a predetermined level, and when said loading is equal to or greater than said predetermined level, said clutch means allows relative motion between said gland and said actuator.

2. A self-adjusting packing gland according to claim 1 wherein said lance tube is moveable axially and rotationally with respect to said feed tube.

3. A self-adjusting packing gland according to claim 1 wherein said sootblower includes a carriage including means for rotating said lance tube through a drive hub and said actuator is restrained from rotation by a frame member of said sootblower.

4. A self-adjustinq packing gland according to claim 3 wherein said gland includes intermeshing mating threads with a said hub and wherein said clutch means comprises a friction clutch coupled between said actuator and said gland and exerting a limited torque between said actuator and said gland whereby when said loading is less than said predetermined amount said actuator and said gland rotate together to cause said gland to be threaded into said hub causing said gland to exert a greater loading on said packing, and when said loading is equal to or greater than said predetermined amount, said gland is not driven to rotate as said clutch slips.

5. A self-adjusting packing gland according to claim 3 wherein said actuator includes a radially projecting feature which engages a surface of said frame member which restrains said actuator rotationally while allowing unrestricted longitudinal motion of said carriage.

6. A self-adjusting packing gland according to claim 5 wherein said radially projecting feature includes means for causing restraint of said actuator in one rotational direction while not restraining said actuator in the opposite rotational direction.

7. A self-adjusting packing gland according to claim 2 wherein said actuator is restrained from rotation only over a portion of the longitudinal travel of said lance tube.

8. In a sootblower device having a feed tube with an overfitting lance tube and a carriage moveable with respect to a frame for causing said lance tube to rotate and move longitudinally with respect to said feed tube such that a blowing medium is ejected from one or more nozzles carried by said lance tube, a self-adjusting packing gland for a packing for providing a seal between said feed tube and said lance tube, comprising:
   a hub affixed to said lance tube and enclosing said packing;
   a tubular gland acting on said packing and having threads intermeshing with threads of said hub for placing an axial loading on said packing;
   an actuator carried by said hub and engageable with said frame whereby, upon rotation of said hub rotation of said actuator is restrained while longitudinal motion of said carriage is unrestricted and;
   friction clutch means acting between said actuator and said gland for coupling a limited torque between said actuator and said gland whereby when said loading is less than a predetermined level, said actuator and said gland rotate together causing said threads of said gland to advance with respect to said hub threads to cause said gland to place an increased loading on said packing, and when said loading is equal to or greater than said predetermined level, said friction clutch means allows relative rotation between said gland and said actuator.

9. A self-adjusting packing gland according to claim 8 wherein said actuator includes a radially projecting feature which engages a surface of said frame which restrains said actuator rotationally while allowing unrestricted longitudinal motion of said carriage.

10. A self-adjusting packing gland according to claim 9 wherein said radially projecting feature includes means for causing restraint of said actuator in one rotational direction while not restraining said actuator in the opposite rotational direction.

11. A self-adjusting packing gland according to claim 8 wherein said actuator is restrained from rotating only over a portion of the longitudinal travel of said lance tube.

* * * * *